United States Patent
Swan et al.

[19]

[11] Patent Number: 5,902,026
[45] Date of Patent: May 11, 1999

[54] VENTED CABINET DOOR WITH FULL LENGTH WINDOW

[75] Inventors: David A. Swan, Shoreview; Todd J. Mickley, Andover, both of Minn.; Robert C. Baxter, Warwick, R.I.

[73] Assignee: Hoffman Enclosures, Inc., Anoka, Minn.

[21] Appl. No.: 08/794,578

[22] Filed: Feb. 3, 1997

[51] Int. Cl.⁶ .................................................... A47F 3/00
[52] U.S. Cl. ..................... 312/138.1; 312/213; 454/184; 49/504
[58] Field of Search ............................... 312/138.1, 213, 312/296, 223.1, 223.2; 52/204.53, 204.54, 204.5, 204.71, 204.72; 454/184, 195; 49/504; 361/690, 692, 724

[56] References Cited

U.S. PATENT DOCUMENTS

| | | | |
|---|---|---|---|
| 1,382,837 | 6/1921 | Jurek | 312/296 X |
| 4,207,707 | 6/1980 | Holdiman et al. | 49/504 X |
| 4,760,496 | 7/1988 | Koch | 361/724 X |
| 4,817,585 | 4/1989 | Craver | 312/138.1 X |
| 4,931,479 | 6/1990 | Morgan | 521/76 |
| 5,016,949 | 5/1991 | Knurr | 312/296 |
| 5,147,121 | 9/1992 | McIlwraith | 312/296 |
| 5,372,416 | 12/1994 | Shapley et al. | 312/138.1 |
| 5,460,441 | 10/1995 | Hastings et al. | 312/223.2 X |
| 5,483,905 | 1/1996 | Johansson | 312/138.1 X |
| 5,584,760 | 12/1996 | Green | 454/195 |
| 5,623,783 | 4/1997 | Kenkel | 454/195 X |
| 5,636,484 | 6/1997 | DeBlock | 52/204.5 |

FOREIGN PATENT DOCUMENTS 2083203  3/1982  United Kingdom ................... 454/195

*Primary Examiner*—Peter M. Cuomo
*Assistant Examiner*—Janet M. Wilkens

[57] ABSTRACT

An enclosure (10) includes a door (12) having a window panel (20) extending from a top edge to a bottom edge. The door (12) includes venting members (26) having vents formed therein extending substantially along either lateral edge of the window panel (20). A spaced apart inner portion (60) provides a vertical conduit for improved circulation. The window panel (20) attaches with adhesive (50) on engagement surfaces (32, 34 and 36) as well as a mechanical connection through threaded members (44).

22 Claims, 5 Drawing Sheets

VENTED CABINET DOOR WITH FULL LENGTH WINDOW

BACKGROUND OF THE INVENTION

1. Field of the Invention

The present invention relates to a door for an enclosure, and in particular, to a door for an electrical enclosure having a window.

2. Prior Art

Doors for cabinets, and in particular, doors for electrical cabinets housing equipment which requires circulating air for temperature control, are well known. Electrical cabinets for servers generally include a height greater than width and may include a window or other viewing panel and may also include vents providing circulation through the door. Such cabinets and some doors may also provide shielding from electromagnetic interference and radio frequency interference. The doors preferably include venting which provides circulation around and through a substantial volume of the enclosure so that internal components are not positioned in a non-cooled location, subjecting the components to overheating and decreased performance or failure.

In addition, it can be appreciated that for inspection and aesthetic purposes, it is preferred that the window panel occupy substantially the entire vertical portion of the door. Many doors used for cabinets provide a window panel which extends vertically, but the doors include a wide border extending around the top, bottom and sides, decreasing the visibility to the inside of the cabinet. Such window panels typically connect the window panel using an adhesive only on two faces. Other doors use clamping through an edge of the panel. However, none of the prior art cabinet doors provide a window panel which is adhesively connected as well as being clamped in position. While clamping may retain the panel in place, it may not provide the desired connection and may lead to some rattling as the panel may not be held tightly in position. For doors which use an adhesive to connect, adhesive may ooze into a visible portion of the panel, as the doors typically do not have a covering edge flange on the front surface of the window. Assembly time and labor costs are increased as excess adhesive must be removed from the panel. If not removed, the aesthetic appeal of the door is decreased.

It can be seen that an improved panel is needed that provides an aesthetically pleasing door and provides for venting through the door and circulation throughout the interior of the cabinet. The cabinet should securely hold a window that extends substantially from the top to bottom edge of the door in a secure manner that provides an aesthetically pleasing border. The present invention addresses these as well as other problems associated with cabinet doors.

SUMMARY OF THE INVENTION

The present invention is directed to a cabinet door, and in particular, to a cabinet door having venting through the door as well as a full length window panel. In the preferred embodiment, the door includes vents extending vertically on either side of the window panel.

The window panel connects along vertical edges to lateral portions of the door. Each lateral portion includes three engagement surfaces engaging a portion of the front, rear and edge of the window panel. Adhesive is applied to the surfaces for attaching to the window panel. Recesses are formed in the engagement surfaces for distributing adhesive and preventing it from flowing outward into a visible area of the window panel. In addition, the door provides for clamping from a front member to a rear member on either face of the window panel. With this configuration and proper selection of construction materials, the door may provide shielding from electromagnetic interference (EMI) and radio frequency interference (RFI).

The venting portion includes a front portion having a plurality of venting orifices formed therein and a rear inner spaced apart portion having larger orifices formed therein. The spaced apart relationship provides for venting vertically next to the window panel. In some embodiments, the vertical space includes filter media for filtering air passing through the vents. It also provides safety features for keeping interior equipment maintained so as to be spaced away from the exterior of the door.

It can be appreciated that with the present invention, the full length window panel is provided having more secure attachment to the door. The panel extends full length from the top to the bottom edge of the door for an improved viewing area. The connection to the window panel provides an aesthetically pleasing border which hides the vertical edges of the window panel so that the adhesive is not visible when viewing the window panel.

These features of novelty and various other advantages which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT

Figure 1:
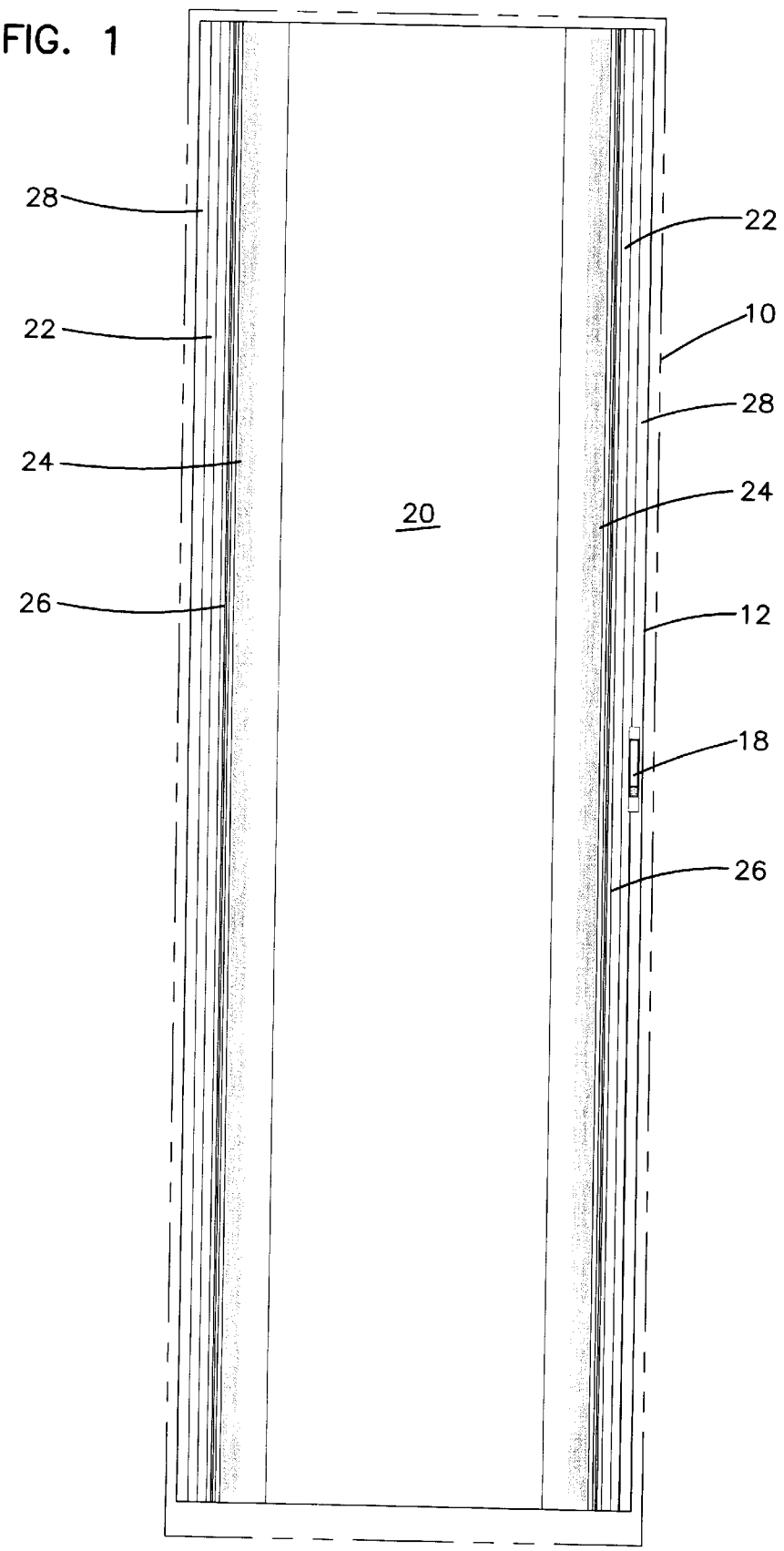
FIG. 1 shows a front elevational view of a door according to the principles of the present invention mounted to an enclosure.
Figure 2:
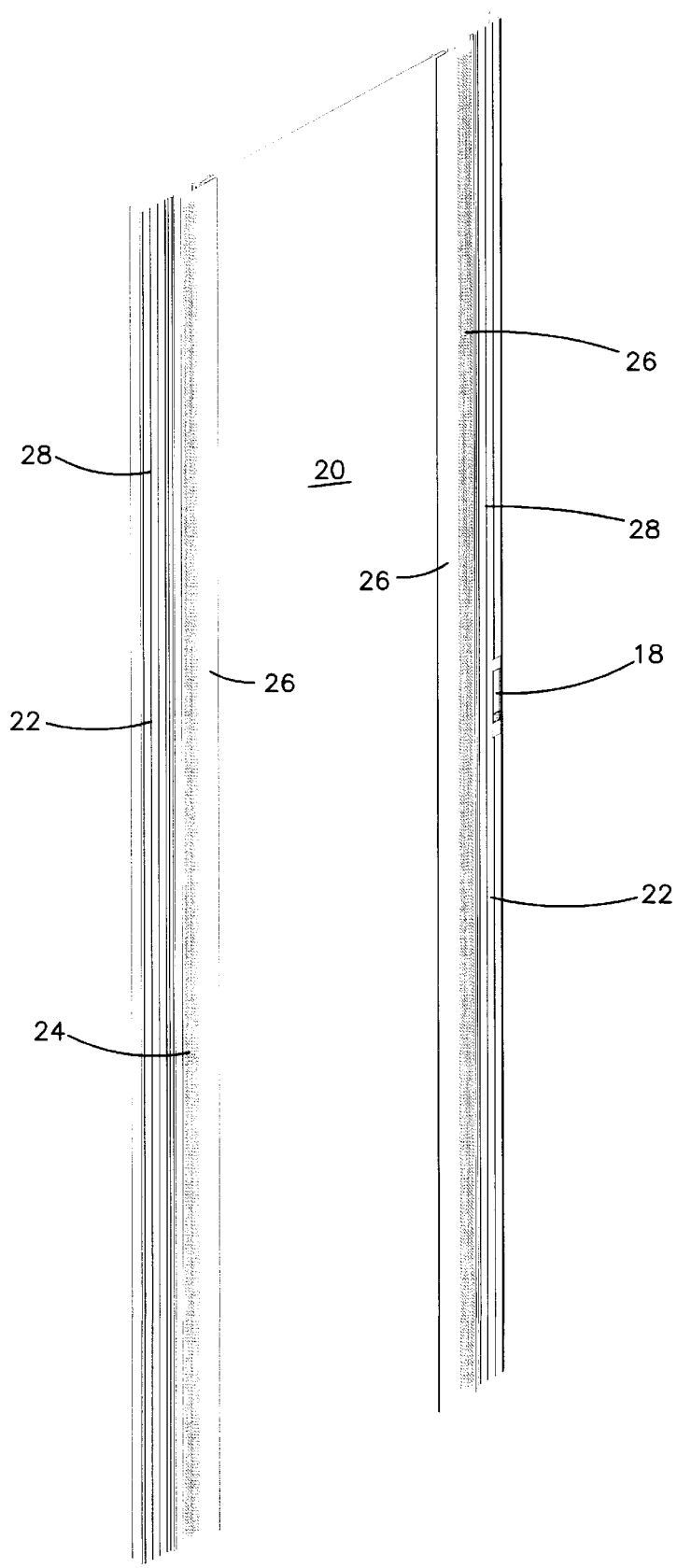
FIG. 2 shows a perspective view of the door shown in FIG. 1.
Figure 3:
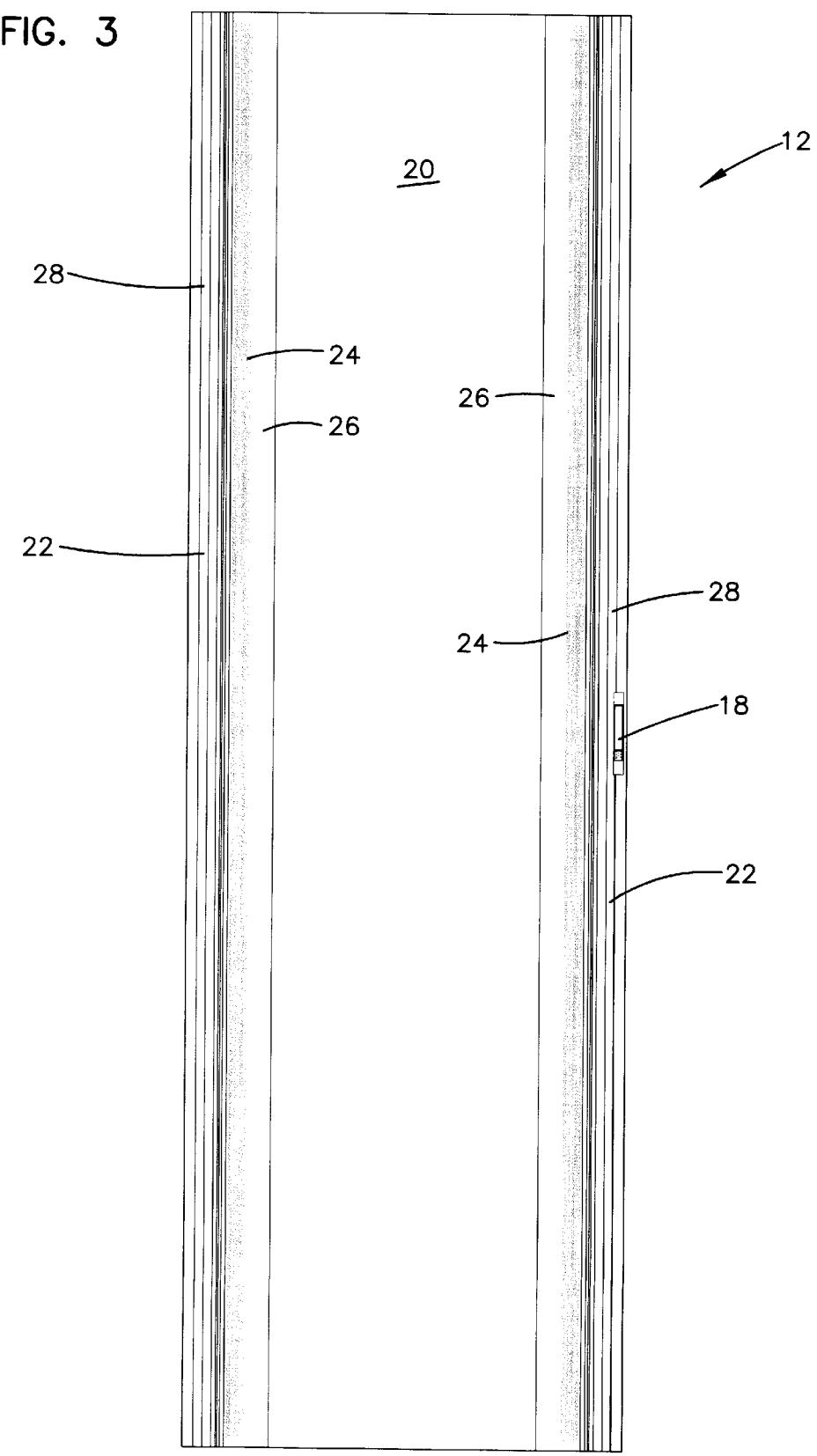
FIG. 3 shows a front elevational view of the door shown in FIG. 2.

Referring now to the drawings, and in particular to FIG. 1, there is shown an enclosure 10 having a door 12, according to the principles of the present invention. The enclosure 10 may typically be used with computer network servers, drives and other electronics, machinery or instruments. Such equipment is generally quite temperature sensitive and requires a cooling and ventilation system to circulate air and maintain the equipment at a proper operating temperature to avoid overheating. To accomplish temperature control, in addition to venting through the sides of the enclosure 10, it is often desirable to vent through the door 12. Such options for venting provide air flow throughout the entire enclosure 10 such that portions of the interior are not cut off from the flow of cooling air, forming hot pockets within the enclosure.

Referring now to FIGS. 2 through 5, the door 12 typically includes a window panel 20. Vertically extending lateral portions 22 are on either side of the window panel 20. Vents 24 are formed through a section of each lateral portion 22 extending substantially the length of the door 12. The door 12 may also include one or more hinges 14 typically mounted along one vertical edge with a latch 16 and handle 18 mounted along the opposite edge. In the embodiment shown, each of the lateral portions 22 includes a venting member 26 and an edge member 28 extending laterally outward from the venting member 26. The window panel 20 extends full length from the top edge of the door 12 to the bottom edge, providing a full vertical view of the interior of the enclosure 10 through the door 12.

Figure 4:
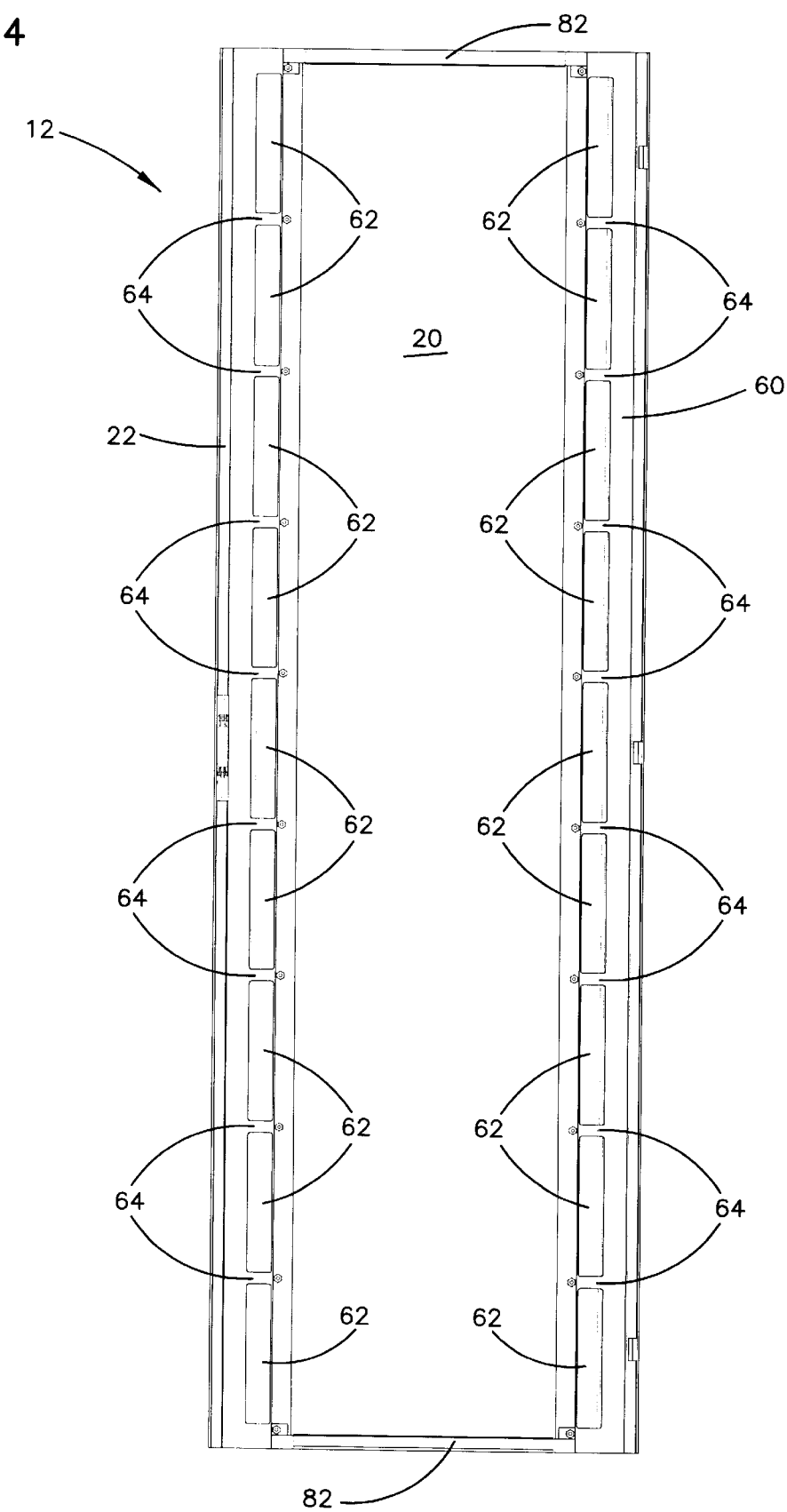
FIG. 4 shows a rear elevational view of the door shown in FIG. 2.

As shown most clearly in FIG. 4, the door 12 includes a metal band 82 extending at both the top and bottom edge of the window panel 20 and mechanically connected to the door. As explained hereinafter, a gasket may extend across the band 82 and engage the door 12 and the enclosure 10.

Figure 6:
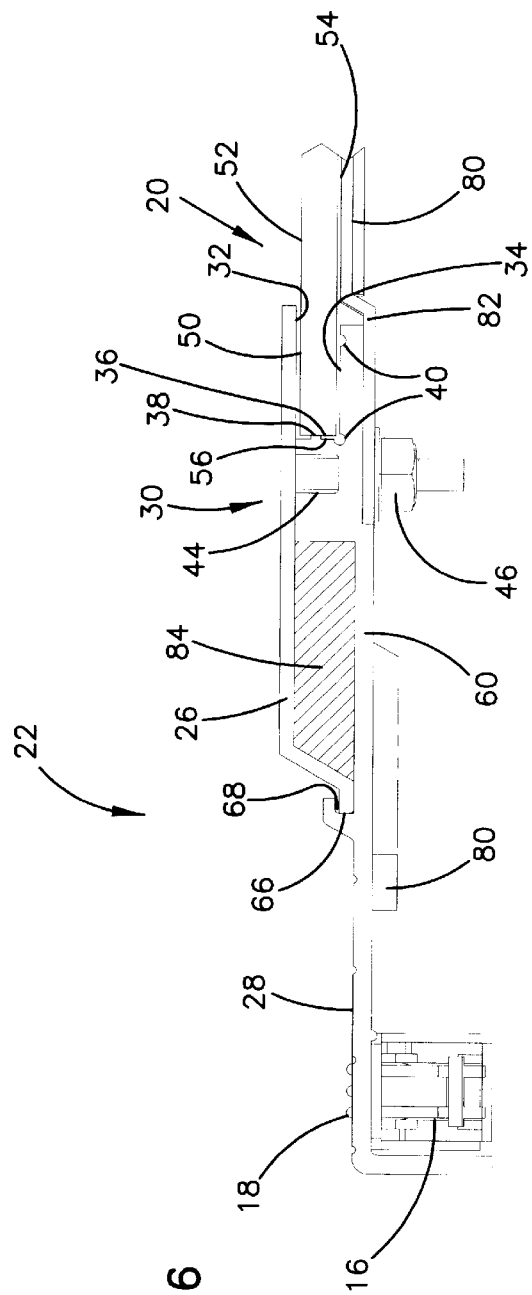

Referring now to FIG. 6, it can be seen that the window panel 20 includes a front face 52, a rear face 54, and edges 56. The window panel 20 may be clear or tinted, depending on the use and environment of the enclosure. The edges 56 insert into a window engaging portion 30. The engaging portion 30 includes a first engaging surface 32, a second engaging surface 34 and a third engaging surface 36. In this configuration, a portion of both the front and rear faces 52 and 54 as well as the edge 56, are engaged to retain the window panel 20 in place. In the preferred embodiment, the venting member 26 forms the first engaging surface 32 while the edge member 28 forms the second and third surfaces 34 and 36. However, it can be appreciated that the third engaging surface 36 could be formed as a portion of the venting member 26 rather than the edge member 28.

The window panel 20 is attached with adhesive 50 to the three engagement surfaces 32, 34 and 36. To facilitate receiving the adhesive 50, ridges 38 and channels 40 are formed in the engagement portion 30. With this configuration, a sufficient yet not excessive amount of adhesive 50 is applied to provide a strong bond between the engagement portion 30 and the window panel 20. In addition, the ridges 38 and channels 40 aid in controlling the spread of the adhesive 50 so that the adhesive does not flow beyond the inner edge of the venting member 26 and remains hidden from view. This provides a more pleasing appearance as opposed to doors wherein excess adhesive seeps beyond the edge of the border member and becomes visible.

In addition to adhesively connecting to the window panel 20, the venting member 26 and edge member 28 are also connected via threaded studs 44 receiving an associated nut 46. The threaded studs 44 typically attach by welding or other well known techniques to the venting member 26, extending through an aligned orifice in the edge member 28. The nuts 46 are tightened to provide a clamping force and mechanical connection to the window panel 20 through engagement surfaces 32 and 34 in addition to an adhesive connection. With this configuration, the door 12 provides three adhesive engagement surfaces 32, 34 and 36 as well as mechanical clamping connections by the threaded studs 44 pulling the venting member 26 and edge member 28 together for retaining the window panel 20.

Figure 5:
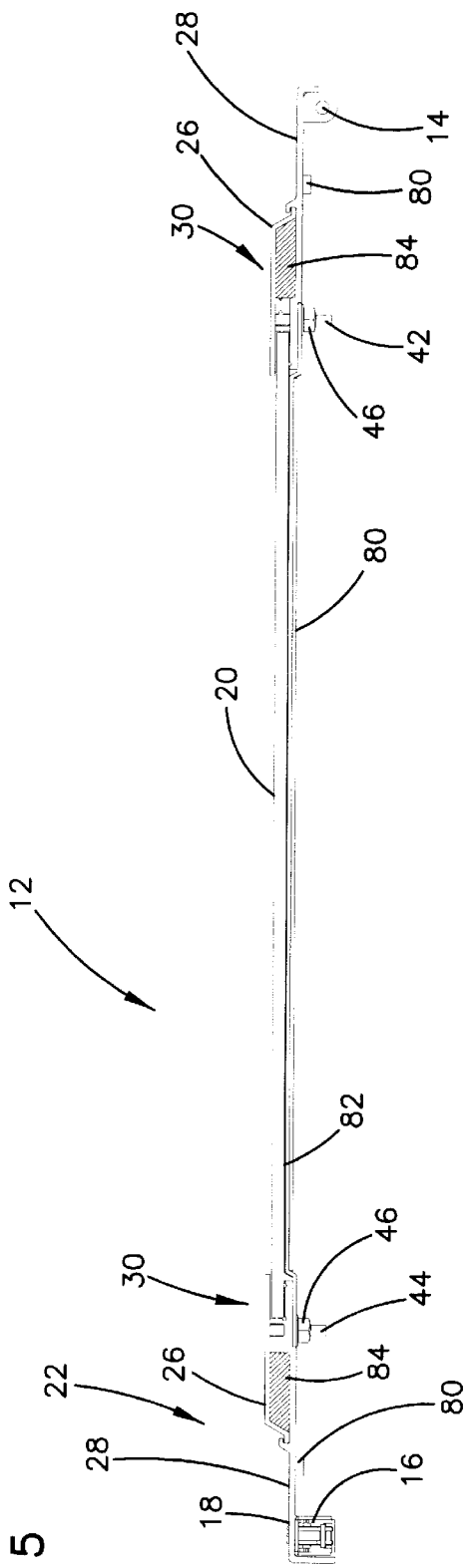
FIG. 5 shows a top plan view of the door shown in FIG. 2 with shielding and filtration; and, FIG. 6 shows a top detail view of the door shown in FIG. 5.

Referring now to FIGS. 4–6, the present invention includes a vertical spacing feature. The venting member 26 extends on the outer portion of the door 12 while the edge member 28 extends laterally along and behind the venting member 26 on the interior as well as laterally outward. The edge member 28 includes an inner spacing portion 60 in spaced apart relationship to the venting member 26. The inner spacer portion includes cross members 64 forming orifices 62 in the spacing portion 60 disposed vertically along the inner spacer portion 60. The venting member 26 connects to the edge member 28 along its inward edge by the threaded studs 44, as explained above. To connect the venting member 26 to the edge member 28, an outer lateral edge 66 of the venting member is inserted into the channel 68 of the edge member 28. The nuts 46 on the threaded studs 44 are then tightened to clamp the venting member 26 to the edge member 28. The outer lateral edge 66 is retained in the channel 68.

It can be appreciated that with a spaced apart relationship, the inner spacer portion 60 forms a conduit with the venting member 26 extending vertically along the door 12. With this configuration, should equipment close off portions of the inner orifices 62, circulation can occur vertically through the conduit formed between the inner spacer portion 60 and the venting member 26. The likelihood of the enclosure being divided into compartments and having circulating air cut off from portions of the enclosure is reduced where the conduit extends substantially from the top to the bottom of the door and along both sides of the door 12. The spacer portion 60 also acts as a safety device, preventing components from accidentally protruding through the vents 24 or having workers accidentally have clothing or other objects catch on equipment within the enclosure.

Referring again to FIGS. 5 and 6, the vertical conduit may include filter media 84 extending along the length of the open space. The filter media 84 may be any fibrous, open cell foam, filtering mat or other filter material. For some environments, other filter materials or combinations may be required.

Referring again to FIGS. 5 and 6, a gasket 80 may extend around the periphery of the interior of the door 12. The gasket 80 aids in reducing noise and vibration through the door. In addition, the window panel 20 and the gasket 80 may be conductive to provide shielding from radio frequency interference (RFI) and electromagnetic interference (EMI). It can be appreciated that in some environments, shielding will be necessary to devices within the enclosure, while with other uses and environments, it may be necessary to shield from interference outside the enclosure. Shielding is possible while also providing venting and a full length view of the interior of the enclosure with the present invention. The window panel 20 is typically a glass panel which has a conductive coating applied on both faces 52 and 54 to provide shielding. In addition, the other components of the door 12 are typically aluminum or other metallic material which will also provide shielding. The gasket 80 and adhesive 50 are made from a conductive compound when shielding is required. Although the vents 24 have holes formed therethrough, the holes are typically sized and spaced so that adequate shielding is still provided. It can also be appreciated that the shielding features of the door 12 may be used with or without the filter 84. When the door 12 is shielded, the filter 84 may include a conductive mesh which would provide further shielding.

It is to be understood, however, that even though numerous characteristics and advantages of the present invention have been set forth in the foregoing description, together with details of the structure and function of the invention, the disclosure is illustrative only, and the changes may be made in detail, especially in matters of shape, size and arrangement of parts within the principles of the invention to the full extent indicated by the broad general meaning of the terms in which the appended claims are expressed.

What is claimed is:

1. A door apparatus comprising:

a window panel extending from a top edge to a bottom edge of the door apparatus;

a lateral portion extending along the window panel;

wherein the lateral portion includes a window panel engagement portion including three engagement surfaces;

wherein the lateral portion includes a first member defining a first one of the engagement surfaces and a second member defining second and third ones of the engagement surfaces; and wherein the second member forms a channel remote from the engagement surfaces and the first member defines a lateral edge portion inserting into the channel.

2. The door apparatus according to claim 1, wherein the engagement surfaces comprise a front surface, a side surface and a rear surface.

3. The door apparatus according to claim 2, wherein the engagement portion includes clamping means biasing the front surface and the rear surface against the window panel.

4. The door apparatus according to claim 2, further comprising adhesive mounting means for attaching the front surface, the side surface and the rear surface to the window panel.

5. The door apparatus according to claim 1, wherein the lateral portion includes a venting section extending along a side of the window panel intermediate the channel and the engagement surfaces.

6. The door apparatus according to claim 5, wherein the venting section includes a front surface having an orifice extending therethrough and a rear surface spaced apart from the front surface having an orifice formed therethrough.

7. The door apparatus according to claim 6, further comprising filtering means intermediate the front surface of the venting section and the rear surface of the venting section.

8. The door apparatus according to claim 1, further comprising adhesive for attaching the three engagement surfaces to the window panel.

9. The door apparatus according to claim 8, wherein at least one of the engagement surfaces includes a channel formed therein for receiving adhesive.

10. The door apparatus according to claim 8, wherein the adhesive comprises a shielding compound.

11. The door apparatus according to claim 10, further comprising a shielding layer on at least one face of the window panel and a shielding gasket on a door inner surface.

12. The door apparatus according to claim 1, wherein the first and second members define a spaced apart section intermediate the engagement surfaces and the channel.

13. A vented cabinet, comprising:

an outer enclosure having an opening formed in a first side;

a door hingedly mounted at the first side to the enclosure, comprising;

a window panel extending vertically from a top edge to a bottom edge of the door;

a venting section extending vertically along at least one side of the window panel;

an attaching portion engaging each vertical edge of the window panel, each attaching portion including a first surface engaging a front portion of the window panel, a second surface engaging a rear portion of the window panel, and a third surface engaging one of the vertical edges of the window panel, wherein each attaching portion comprises clamping means for clamping the attaching portion to the front and rear portions of the window panel; and adhesive attaching to a portion of the first, second and third surfaces and the window panel.

14. The cabinet according to claim 13, further comprising channels formed in the second and third surfaces and proximate the window panel.

15. The cabinet according to claim 14, wherein the adhesive flows into the channels.

16. The cabinet according to claim 13, wherein each attaching portion includes a first member on a first face of the window panel and a second member on a second face of the window panel.

17. A door apparatus, comprising:

a window panel extending from a top edge to a bottom edge of the door apparatus;

venting sections disposed laterally about each vertical side of the window panel;

an edge portion mounted laterally outside of each venting section;

wherein each of the venting sections includes a clamping portion extending along a vertical edge of the window panel; and adhesive attaching each vertical edge and portions of a face of the window panel to a respective edge portion.

18. The door apparatus according to claim 17, wherein each of the venting sections includes a front surface having an orifice extending therethrough and a rear surface spaced apart from the front surface having an orifice formed therethrough.

19. The door apparatus according to claim 18, wherein each edge portion defines a channel remote from the associated one of the clamping portions and each venting section includes a portion engaging the associated one of the channels.

20. A cabinet comprising:

an enclosure having an opening formed in a first side;

a door hingedly mounted at the first side to the enclosure, the door comprising:

a window panel extending from a top edge to a bottom edge of the door;

a lateral portion extending along the window panel;

wherein the lateral portion includes a window panel engagement portion including three engagement surfaces;

wherein the lateral portion includes a first member defining a first one of the engagement surfaces and a second member defining second and third ones of the engagement surfaces; and wherein the second member forms a channel remote from the engagement surfaces and the first member defines a lateral edge portion inserting into the channel.

21. A door, comprising:

a window panel extending vertically from a top edge to a bottom edge of the door;

a venting section extending vertically along at least one side of the window panel;

an attaching portion engaging each vertical edge of the window panel, each attaching portion including a first surface engaging a front portion of the window panel, a second surface engaging a rear portion of the window panel, and a third surface engaging one of the vertical edges of the window panel; wherein each attaching portion comprises clamping means for clamping the attaching portion to the front and rear portions of the window panel; and, adhesive attaching to a portion of the first, second and third surfaces and the window panel.

22. A cabinet comprising:

an enclosure having an opening formed in a first side;

a door hingedly mounted at the first side to the enclosure, the door comprising:

a window panel extending from a top edge to a bottom edge of the door;

an edge portion mounted laterally about each vertical side of the window panel;

venting sections disposed laterally about each vertical side of the window panel and intermediate the window panel and intermediate the window panel and a respective edge portion;

a clamping portion extending along each vertical edge of the window panel; and adhesive attaching each vertical edge of the window panel and portions of a face of the window panel to a respective edge portion.

* * * * *